United States Patent
Rico Alvarino et al.

(10) Patent No.: US 10,321,417 B2
(45) Date of Patent: Jun. 11, 2019

(54) ENHANCED CELL ACQUISITION FOR ENHANCED MACHINE TYPE COMMUNICATIONS

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/063,791

(22) Filed: Mar. 8, 2016

(65) Prior Publication Data

US 2016/0295529 A1    Oct. 6, 2016

Related U.S. Application Data

(60) Provisional application No. 62/142,935, filed on Apr. 3, 2015.

(51) Int. Cl.
*H04W 52/38* (2009.01)
*H04W 52/02* (2009.01)
(Continued)

(52) U.S. Cl.
CPC ............ *H04W 52/38* (2013.01); *H04B 17/23* (2015.01); *H04B 17/318* (2015.01);
(Continued)

(58) Field of Classification Search
CPC . H04W 52/38; H04W 52/143; H04W 76/048; H04W 48/12; H04W 52/18;
(Continued)

(56) References Cited

U.S. PATENT DOCUMENTS

| | | | |
|---|---|---|---|
| 2010/0182903 A1* | 7/2010 | Palanki | H04L 1/0041 370/225 |
| 2011/0235582 A1* | 9/2011 | Chen | H04W 52/243 370/328 |
| 2014/0301305 A1 | 10/2014 | Xu et al. | |
| 2015/0078300 A1 | 3/2015 | Xu et al. | |
| 2015/0245295 A1* | 8/2015 | Jha | H04W 76/048 370/311 |

(Continued)

FOREIGN PATENT DOCUMENTS

| | | | |
|---|---|---|---|
| WO | WO-2014170227 A1 | 10/2014 | |
| WO | WO 2014170229 A1 * | 10/2014 | ............ H04W 48/08 |
| WO | WO-2014170229 A1 | 10/2014 | |

OTHER PUBLICATIONS

LTE in a Nutshell—Physical Layer 2010.*

(Continued)

*Primary Examiner* — Dong-Chang Shiue

(74) *Attorney, Agent, or Firm* — Patterson & Sheridan, LLP

(57) ABSTRACT

Aspects of the present disclosure provide techniques that may be used by a BS and/or UE to reduce the time associated with performing cell acquisition. An exemplary method, performed by a BS, generally includes determining opportunities for assisting cell acquisition by one or more UEs, and boosting transmission power for one or more signals used for cell acquisition during the determined opportunities. Another exemplary method, performed by a UE, generally includes exiting a first low power state in order to perform cell acquisition based on one or more signals transmitted by a base station, and taking one or more actions to reduce acquisition time when performing the cell acquisition.

20 Claims, 10 Drawing Sheets

(51) Int. Cl.
| | |
|---|---|
| *H04W 52/18* | (2009.01) |
| *H04W 52/14* | (2009.01) |
| *H04W 52/44* | (2009.01) |
| *H04W 48/12* | (2009.01) |
| *H04B 17/23* | (2015.01) |
| *H04B 17/318* | (2015.01) |
| *H04W 48/20* | (2009.01) |
| *H04W 76/28* | (2018.01) |

(52) U.S. Cl.
CPC ....... *H04W 48/12* (2013.01); *H04W 52/0225* (2013.01); *H04W 52/143* (2013.01); *H04W 52/18* (2013.01); *H04W 52/44* (2013.01); *H04W 48/20* (2013.01); *H04W 76/28* (2018.02); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01); *Y02D 70/26* (2018.01)

(58) Field of Classification Search
CPC . H04W 52/44; H04W 52/0225; H04W 76/28; H04B 17/23; H04B 17/318
See application file for complete search history.

(56) References Cited

U.S. PATENT DOCUMENTS

2016/0066296 A1 3/2016 Su et al.
2016/0142981 A1* 5/2016 Yi ....................... H04J 11/0069
455/522

OTHER PUBLICATIONS

Partial International Search Report—PCT/US2016/021476—ISA/EPO—dated Jun. 1, 2016.
International Search Report and Written Opinion—PCT/US2016/021476—ISA/EPO—dated Aug. 4, 2016.
European Search Report—EP18207854—Search Authority—The Hague—dated Mar. 11, 2019.

* cited by examiner

ENHANCED CELL ACQUISITION FOR ENHANCED MACHINE TYPE COMMUNICATIONS

CROSS-REFERENCE TO RELATED APPLICATION(S)

This application claims the benefit of U.S. Provisional Application Ser. No. 62/142,935, entitled ENHANCED CELL ACQUISITION FOR ENHANCED MACHINE TYPE COMMUNICATIONS," filed Apr. 3, 2015, assigned to the assignee hereof and hereby expressly incorporated by reference herein.

BACKGROUND

I. Field of the Disclosure

Certain aspects of the present disclosure generally relate to wireless communications and, more particularly, to techniques for reducing cell acquisition time by certain wireless devices, such as machine type communication(s) (MTC) devices with coverage enhancements.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques and apparatus for reducing the amount of time associated with searching and/or acquiring a cell.

Certain aspects of the present disclosure provide a method for wireless communications by a base station (BS). The method generally includes determining one or more opportunities for assisting cell acquisition by one or more user equipments (UEs), and boosting transmission power for one or more signals used for cell acquisition during the determined opportunities.

Certain aspects of the present disclosure provide a method for wireless communications by a user equipment (UE). The method generally includes exiting a first low power state in order to perform cell acquisition based on one or more signals transmitted by a base station, and taking one or more actions to reduce acquisition time when performing the cell acquisition.

Certain aspects of the present disclosure provide an apparatus for wireless communications. The apparatus generally includes means for determining one or more opportunities for assisting cell acquisition by one or more UEs, and means for boosting transmission power for one or more signals used for cell acquisition during the determined opportunities.

Certain aspects of the present disclosure provide an apparatus for wireless communications. The apparatus generally includes means for exiting a first low power state in order to perform cell acquisition based on one or more signals transmitted by a base station, and means for taking one or more actions to reduce acquisition time when performing the cell acquisition.

Certain aspects of the present disclosure provide an apparatus for wireless communications. The apparatus generally includes at least one processor configured to determine one or more opportunities for assisting cell acquisition by one or more UEs, and boost transmission power for one or more signals used for cell acquisition during the determined one or more opportunities. The apparatus also includes a memory coupled with the at least one processor.

Certain aspects of the present disclosure provide an apparatus for wireless communications. The apparatus generally includes at least one processor configured to exit a first low power state in order to perform cell acquisition based on one or more signals transmitted by a base station, and take one or more actions to reduce acquisition time when performing the cell acquisition. The apparatus also includes a memory coupled with the at least one processor.

Certain aspects of the present disclosure provide a computer-readable medium having computer executable code stored thereon. The computer-readable medium generally includes code for determining one or more opportunities for assisting cell acquisition by one or more UEs, and boosting transmission power for one or more signals used for cell acquisition during the one or more determined opportunities.

Certain aspects of the present disclosure provide a computer-readable medium having computer executable code stored thereon. The computer-readable medium generally includes code for causing a UE to exit a first low power state in order to perform cell acquisition based on one or more signals transmitted by a base station, and taking one or more actions to reduce acquisition time when performing the cell acquisition.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used where possible, to designate identical elements that are common to the figures. It is contemplated that elements disclosed in one embodiment may be beneficially utilized on other embodiments without specific recitation.

DETAILED DESCRIPTION

Figure 1:
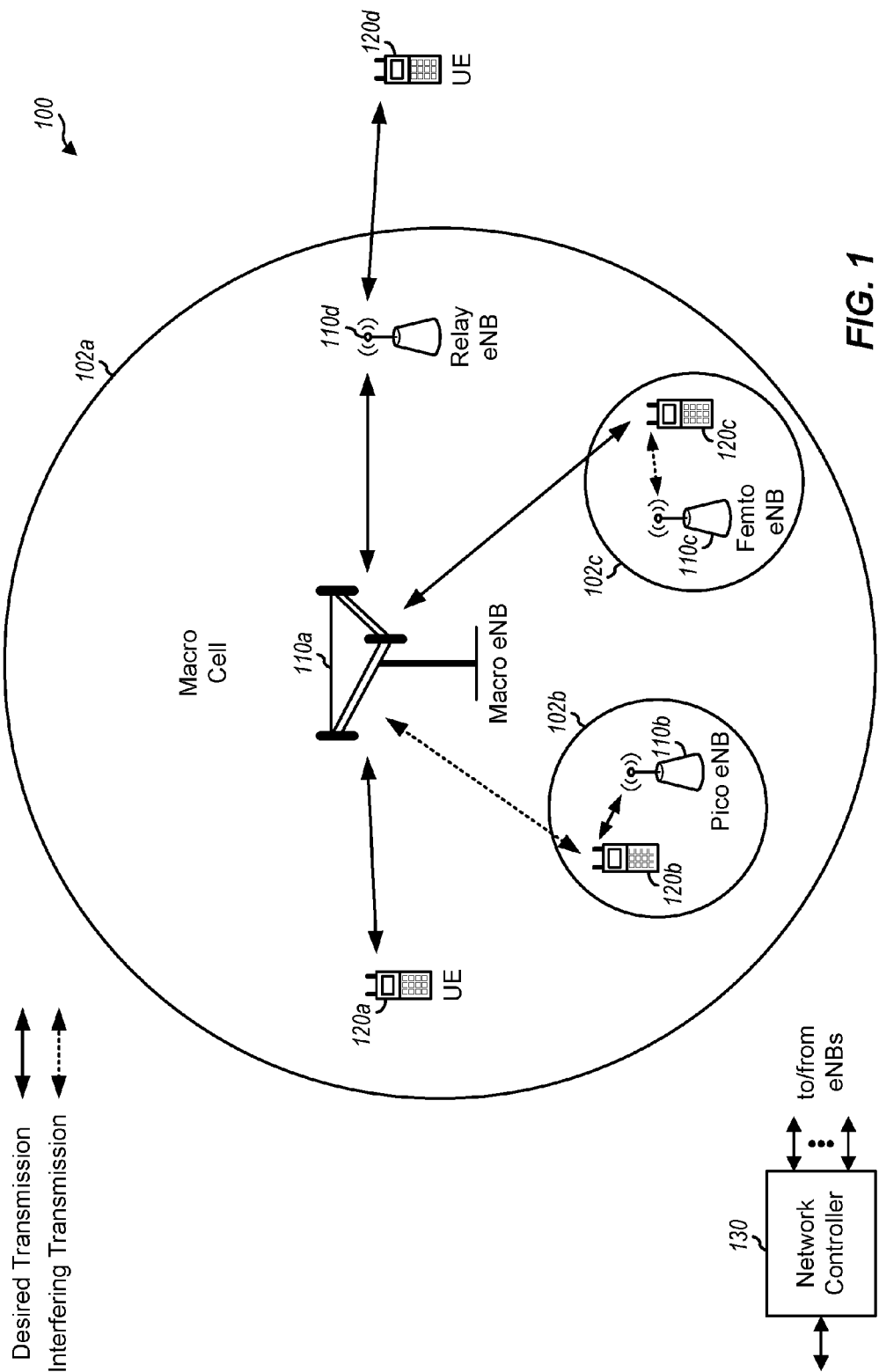
FIG. 1 is a block diagram conceptually illustrating an example of a wireless communication network, in accordance with certain aspects of the present disclosure.

Aspects of the present disclosure provide various enhanced techniques that may be used to reduce the time associated with searching and acquiring a cell, relative to traditional cell acquisition techniques. The techniques may used by certain devices, such as MTC devices and/or enhanced or evolved MTC (eMTC) devices, to reduce the amount of time associated with receiving one or more signals (e.g., such as primary synchronization signal, secondary synchronization signal, physical broadcast channel, etc.) used for cell acquisition.

For example, as described in more detail below, in some aspects, a base station may assist one or more user equipments in cell acquisition by boosting the transmission power of the one or more signals. These signals may be boosted during certain opportunities that are based, in part, on one or more power states of the user equipments. Similarly, in some aspects, as also described in more detail below, user equipments may take one or more actions to reduce acquisition time when performing the cell acquisition. Such actions may include exiting one or more low power states to monitor for the one or more signals that are power boosted from the base station, monitoring for a reduced set of the one or more signals, terminating the cell acquisition based on signal quality measurements, etc.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

FIG. 1 illustrates an example wireless communication network 100, in which aspects of the present disclosure may be practiced. For example, one or more signals used for searching for a cell and/or acquiring a cell may be transmitted by one or more BSs/eNBs 110 in the wireless communication network 100 to one or more UEs 120 in the wireless communication network 100. As will be described in more detail below, the techniques presented herein may be used by the eNBs 110 and/or UE(s) 120 to reduce the amount of time associated with UEs 120 performing cell acquisition based on the one or more signals. As used herein, the term "cell acquisition" may be used to refer to searching for a cell and/or acquiring the cell (e.g., synchronizing to the cell).

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Examples of UEs may include a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, gaming devices, navigation devices, virtual reality devices, wearable devices (e.g., smart glasses/goggles/heads-up displays, smart watch, smart wristband, smart clothing), drones, robots/robotic devices, vehicular devices, etc. Some UEs may be MTC UEs. Examples of MTC UEs include sensors, meters, monitors, location tags, drones, trackers, robots/robotic devices, etc. To enhance coverage of certain devices, such as MTC devices, "bundling" may be utilized in which certain transmissions are sent as a bundle of transmissions, for example, with the same information transmitted over multiple subframes. Some MTC UEs, as well as other UEs, may be implemented as internet of things (IoT) devices (e.g., narrowband IoT (NB-IoT) devices) or internet of everything (IoE) devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost, low data rate devices, e.g., such as low cost MTC UEs, low cost eMTC UEs, low cost IoT UEs, etc. The low cost UEs may co-exist with legacy and/or advanced UEs in the LTE network and may have one or more capabilities that are limited when compared to the other UEs (e.g., non-low cost UEs) in the wireless network. For example, in LTE Rel-12, when compared to legacy and/or advanced UEs in the LTE network, the low cost UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the low cost UEs may have a relaxed switching timing from transmit to receive (or from receive to transmit) operations. For example, in one case, compared to a switching timing of 20 microseconds (us) for legacy and/or advanced UEs, the low cost UEs may have a relaxed switching timing of 1 millisecond (ms).

In some cases, the low cost UEs may also be able to monitor downlink (DL) control channels in the same away as legacy and/or advanced UEs in the LTE network monitor DL control channels. For example, the low cost UEs may monitor for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

The wireless communication network 100, as an alternative or in addition to supporting MTC operation, may support additional MTC enhancements (e.g., eMTC operations). For example, low cost eMTC UEs (e.g., in LTE Rel-13) may be able to support narrowband operation (e.g., operating on one or more narrowband regions partitioned out of an available system bandwidth that is supported by a particular RAT. Referring to LTE, low cost UEs may operate on a particular narrowband assignment of 1.4 MHz or six resource blocks (RBs) (partitioned out of the available system bandwidth) while co-existing within a wider system bandwidth (e.g., at 1.4/3/5/10/15/20 MHz). The low cost eMTC UEs may also support one or more coverage modes of operation (where repetitions of the same message may be bundled or transmitted across multiple subframes). For example, the low cost eMTC UE may support coverage enhancements up to 15 dB with respect to legacy LTE users.

As used herein, devices with limited communication resources, such as MTC devices, eMTC devices, etc. are referred to generally as low cost UEs. Similarly, legacy devices, such as legacy and/or advanced UEs (e.g., in LTE) are referred to generally as non-low cost UEs.

In some cases, a UE (e.g., low cost UE or non-low cost UE) may perform a cell search and acquisition procedure before communicating in the network. In one case, with reference to the LTE network illustrated in FIG. 1 as an example, a UE may perform a cell search and acquisition procedure when the UE is not connected to a LTE cell and wants to access the LTE network. In these cases, the UE may have just powered on, restored a connection after temporarily losing connection to the LTE cell, etc.

In other cases, a UE may perform the cell search and acquisition procedure when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may perform the cell search and acquisition procedure (even though the UE is still in connected mode).

Figure 2:
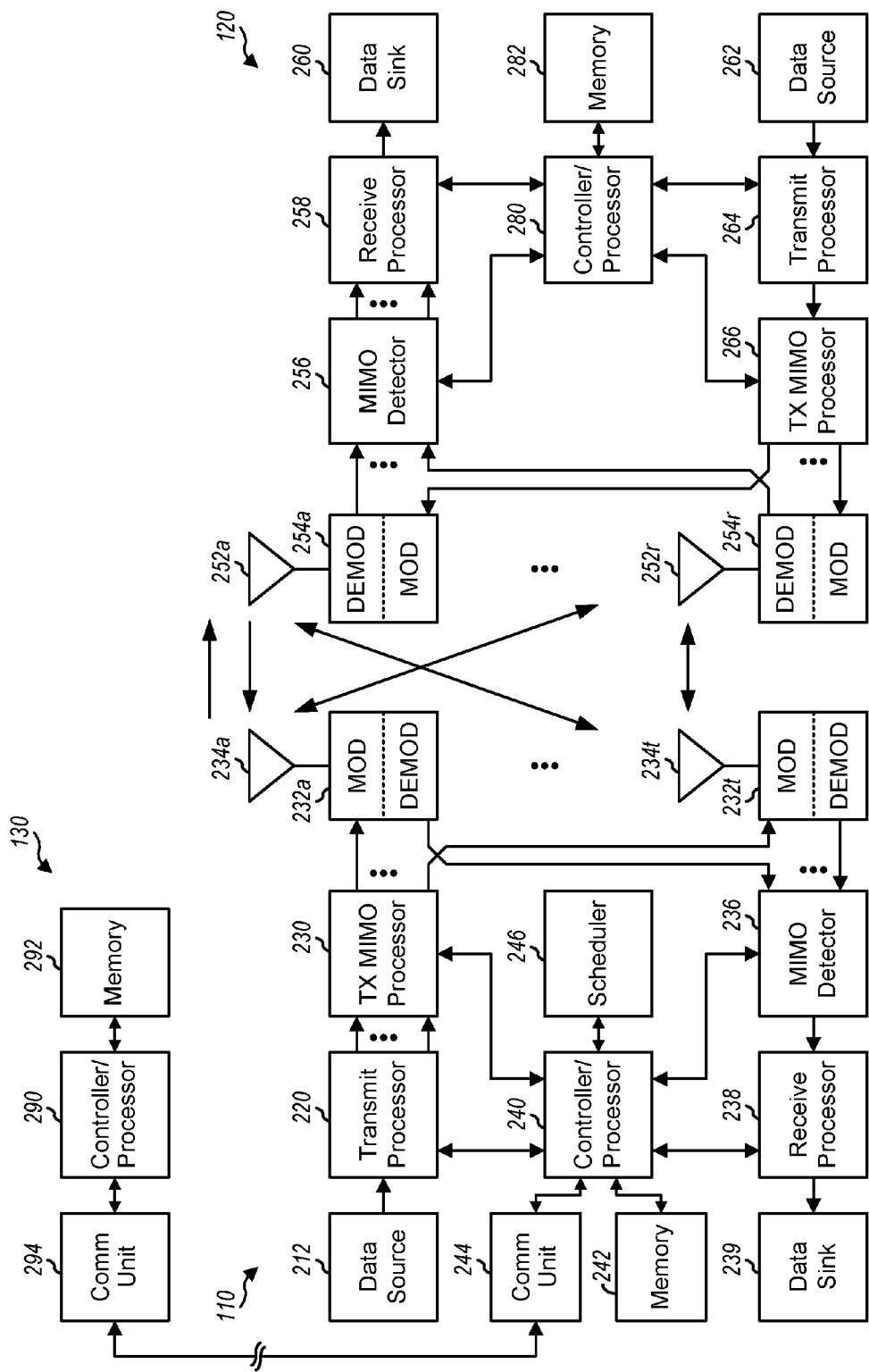
FIG. 2 shows a block diagram conceptually illustrating an example of a base station in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 600 illustrated in FIG. 6 and/or other processes for the techniques described herein. Similarly, controller/processor 280 and/or other processors and modules at UE 120 may perform or direct operations 700 illustrated in FIG. 7 and/or other processes for the techniques described herein. Memories 242 and 282 may store data and program codes for BS 110 and UE 120, respectively. A scheduler 246 may schedule UEs for data transmission on the downlink and/or uplink.

Figure 3:
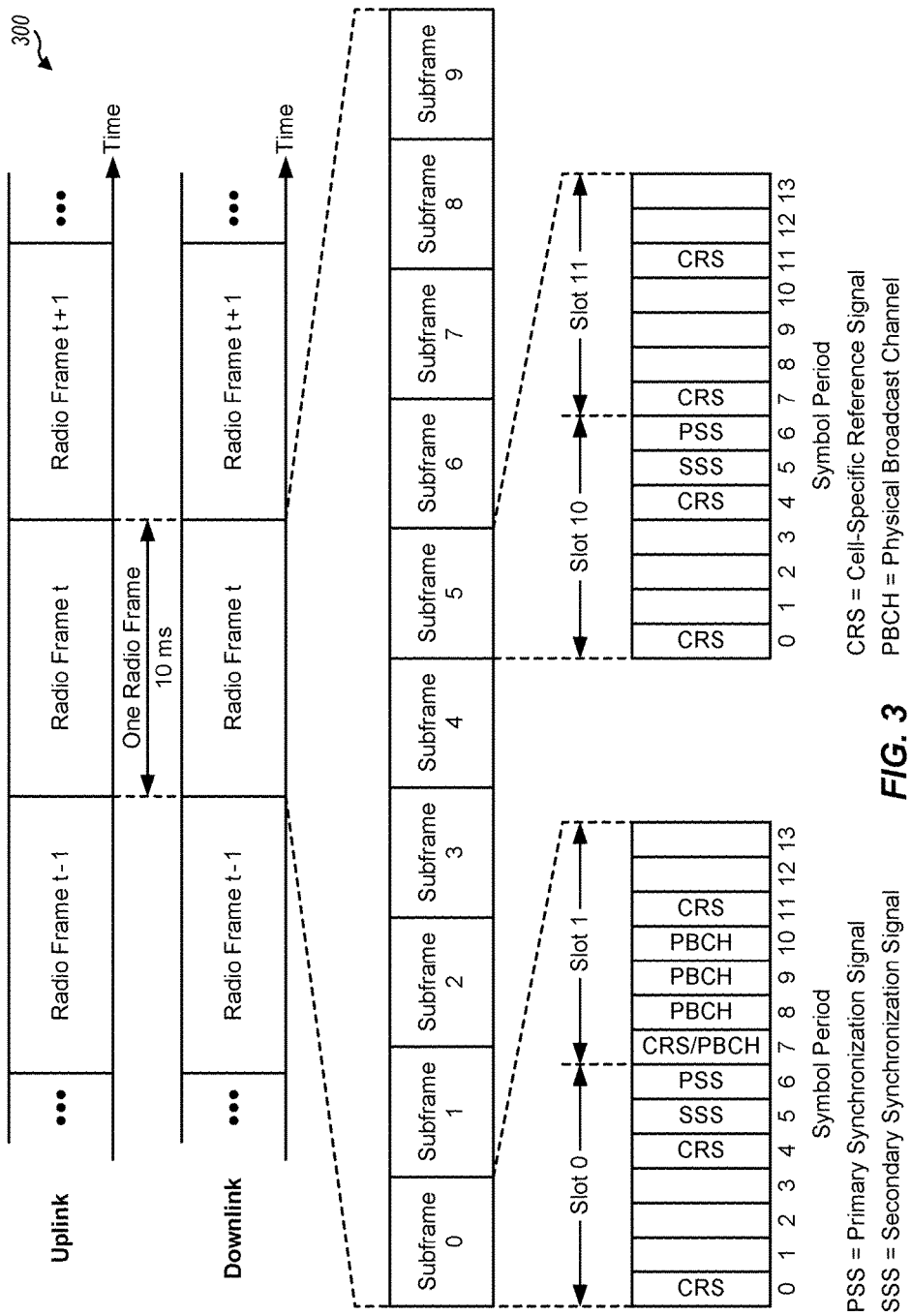
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2 L symbol periods in each subframe may be assigned indices of 0 through 2 L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. For example, the PSS may provide the UE with information regarding the physical layer identity (e.g., 0 to 2), which may identify which of three groups of physical layer cell identifies a LTE cell may belong. The PSS may also be used by the UE in symbol timing detection, frequency offset detection, etc. The SSS may provide the UE with information regarding the physical layer cell identity group number (e.g., 0 to 167) and may be used by the UE for radio frame timing detection, cyclic prefix length detection, time division duplexing (TDD)/frequency division duplexing (FDD) detection, etc.

The UE may determine the physical layer cell identity (PCI) for a given cell based on the physical layer identity (e.g., from PSS) and the physical layer cell identity group number (e.g., from SSS). For example, in one embodiment, the PCI may be equal to 3×(physical layer cell identity group)+physical layer identity. Once the UE determines the PCI for a given cell, as described below, the UE may determine the location of reference signals transmitted from the cell and may be able to receive and decode system information (e.g., used for acquiring the cell) transmitted from the cell.

The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry some system information (e.g., the master information block (MIB)) that, in general, may be used by UEs for initial access to the cell, and the like. For example, the PBCH may carry information regarding system bandwidth, number of transmit antennas, system frame number, etc. The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
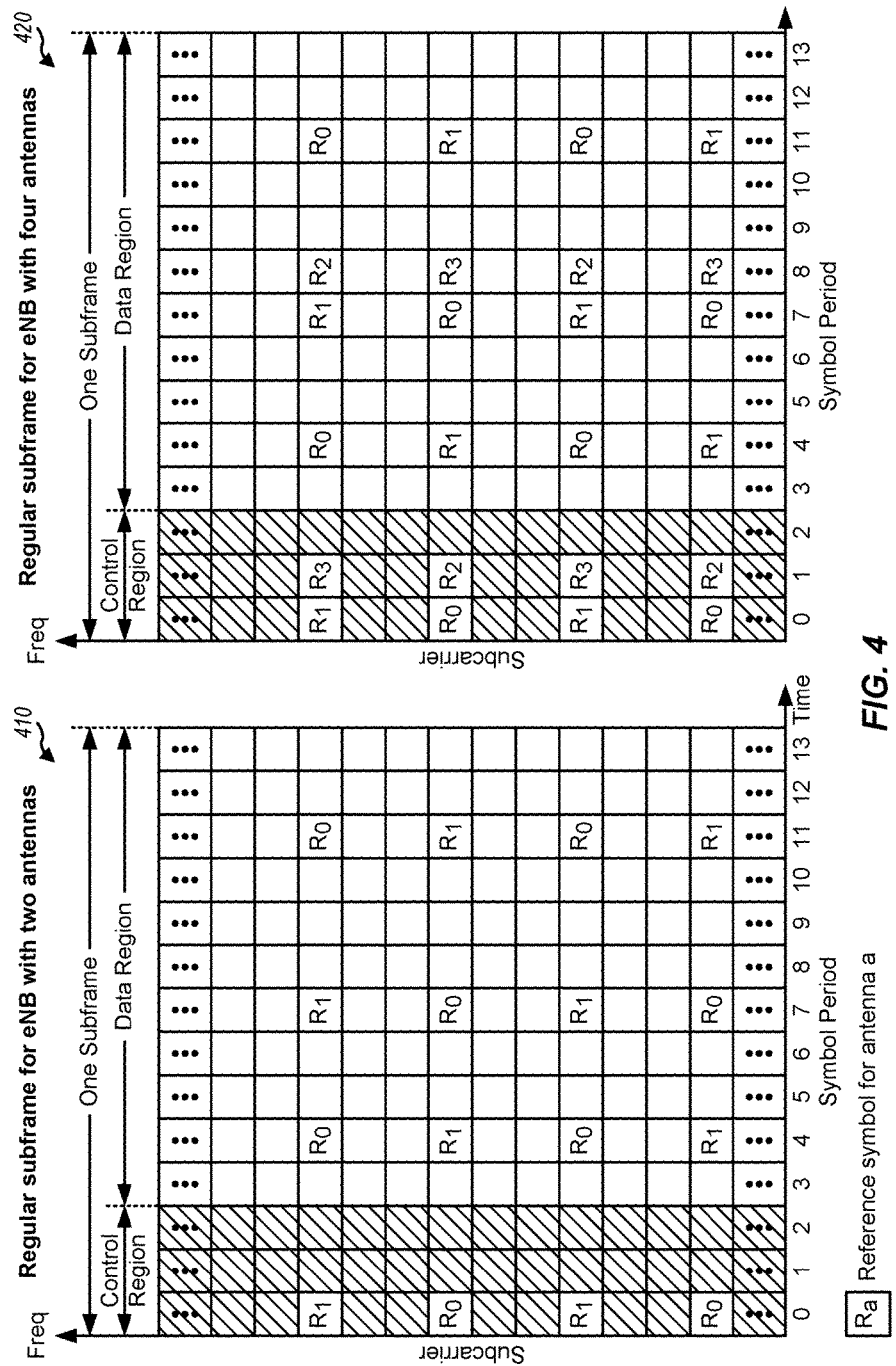
FIG. 4 is a block diagram conceptually illustrating two exemplary subframe formats with the normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as low cost UEs, as compared to other (non-low cost) devices in the wireless communication network. For example, as noted above, The low cost UE may be a link budget limited device and may operate in different modes of operation (e.g. using different numbers of repetitions for messages transmitted to or from the low cost UE) based on its link budget limitation. For example, in some cases, the low cost UE may operate in a normal coverage mode in which there is little to no repetition (e.g., the amount of repetition needed for the UE to successfully receive and/or transmit a message may be low or repetition may not even be needed). Alternatively, in some cases, the low cost UE may operate in a coverage enhancement (CE) mode in which there may be high amounts of repetition. Further, in some cases, non-low cost UEs may also be able to support the CE mode.

Figure 5:
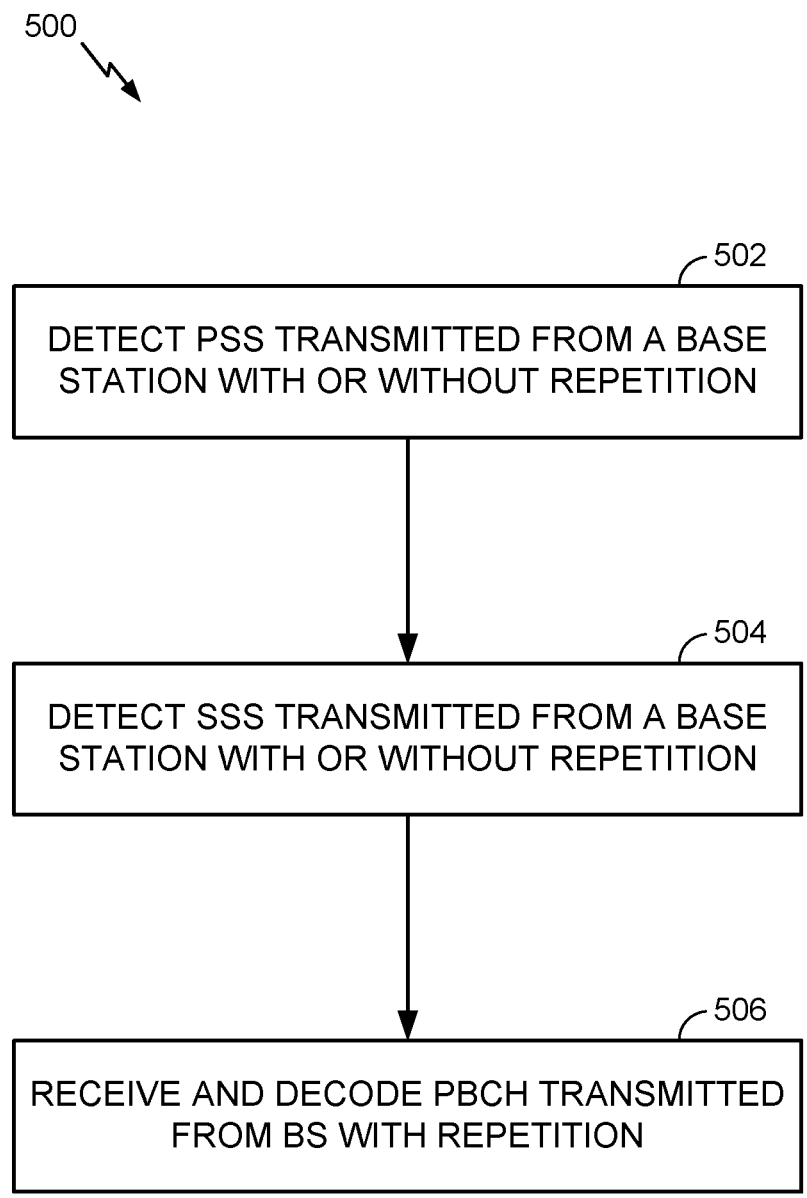
FIG. 5 illustrates example signals that may be used in a cell search procedure, in accordance with certain aspects of the present disclosure.

In some cases, when operating in CE mode, a UE (e.g., low cost UE and/or non-low cost UE) may perform a cell search and acquisition procedure (e.g., upon powering up, exiting a low power mode(s), entering a new cell, handover, etc.). FIG. 5 illustrates an example cell search procedure 500 that may be used by certain devices operating in CE mode.

As shown in FIG. 5, at 502, the UE may first detect PSS transmitted from a BS. At 504, the UE may then detect SSS transmitted from the BS. In some cases, as shown, even when the UE is in CE mode, the PSS and SSS may not be transmitted with repetition. However, in other cases, the PSS and SSS may be transmitted with repetition. As noted above, upon detecting the PSS and SSS, the UE may determine PCI for a given cell and may be able to receive system information broadcasted (e.g., in a PBCH) from the cell.

At 506, the UE may receive (with repetition) a PBCH broadcasted from a BS. In some cases, the UE may be able to receive the PBCH with one or more additional repetitions of the PBCH across multiple subframes (e.g., such that UEs in bad radio channel conditions are able to successfully receive and/or decode the PBCH transmitted in the cell). The repetition of PBCH may be within subframe 0 and additionally in other subframes (e.g., subframe 5, etc.).

As mentioned above, in some cases (e.g., when a UE supports DRX operation), a UE operating in a low power state may perform a cell search and acquisition procedure upon exiting (or waking up from) the low power state. For example, upon waking up from the low power state, the UE may have an inaccurate timing synchronization (e.g., due, in part, to a local clock drifting), the UE's local oscillator may have drifted, etc. Thus, in some cases, even when a UE is in connected mode, but in DRX operation, the UE may perform a cell search and acquisition procedure to correct timing and/or frequency synchronization to a cell.

However, for certain devices that have limited communication resources, such as low cost UEs, the cell search and acquisition procedure may take an excessive amount of time. For example, low cost UEs may, in general, operate in environments with very poor radio channel conditions as measured by one or metrics such as signal-to-noise ratio (SNR), pathloss, received signal strength, and the like. In one case, as an example, a UE may operate with a SNR of −15 dB while in CE mode. When operating in poor radio channel conditions, the low cost UEs may use a number of repetitions (e.g., CE mode) of one or more cell acquisition signals (e.g., PSS, SSS, PBCH, etc.) before the UE is able to acquire the cell. In these circumstances, the UE may miss paging opportunities (e.g., if the search is not successful) and/or increase battery consumption (due, in part, to the increased time it takes to perform cell acquisition as the UE may have to wake up ahead of time to search for the cell).

Accordingly, it may be helpful to provide techniques that may reduce the time associated with performing cell acquisition.

Techniques for Enhancing Cell Acquisition

As mentioned above, one or more techniques presented herein may be used by one or more BSs to assist certain devices (e.g., low cost UEs, non-low cost UEs) in performing cell acquisition. The one or more techniques presented herein may also be used by certain devices (e.g., low cost UEs, non-low cost UEs) to reduce the time associated with performing cell acquisition. As used herein, the term "cell acquisition" may be used to refer to searching for a cell and/or acquiring the cell (e.g., synchronizing to the cell).

Figure 6:
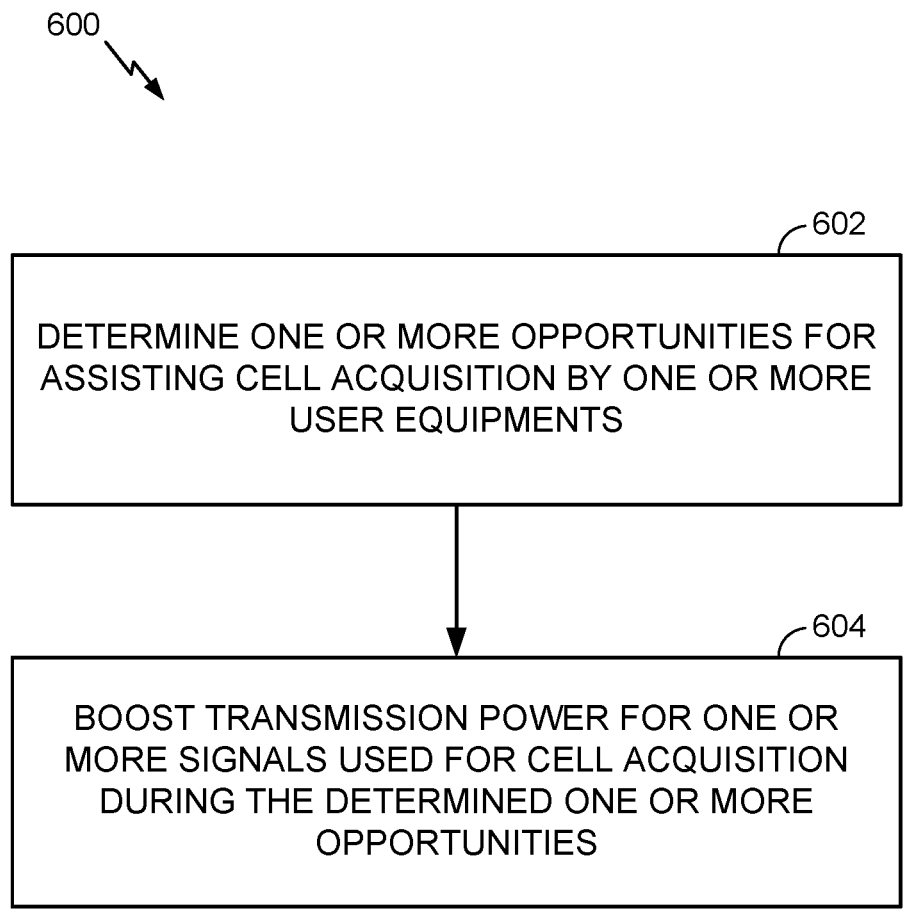
FIG. 6 illustrates example operations for wireless communications that may be performed by a base station, in accordance with certain aspects of the present disclosure.

FIG. 6 illustrates example operations 600 for wireless communications, in accordance with certain aspects of the present disclosure. The operations 600 can performed by a BS, such as one of the BSs/eNBs 110 illustrated in FIGS. 1 and 2.

The operations 600 may begin, at 602, where the BS determines one or more opportunities for assisting cell acquisition by one or more UEs. At 604, the BS boosts transmission power for one or more signals used for cell acquisition during the determined one or more opportunities.

Figure 7:
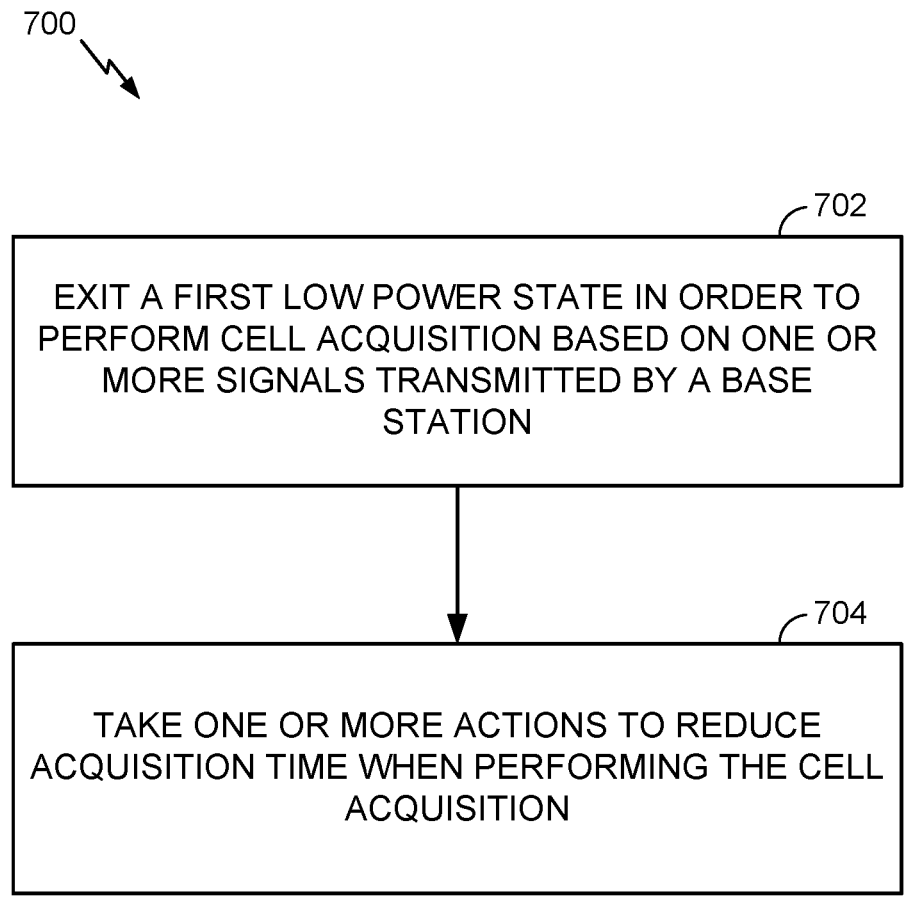
FIG. 7 illustrates example operations for wireless communications that may be performed by a user equipment, in accordance with certain aspects of the present disclosure.

FIG. 7 illustrates example operations 700 for wireless communications, in accordance with certain aspects of the present disclosure. The operations 700 can be performed by a UE, such as a low cost UE, non-low cost UE, etc., which may be one of the UEs 120 illustrated in FIGS. 1 and 2.

The operations 700 may begin, at 702, where the UE exits a first low power state in order to perform cell acquisition based on one or more signals transmitted by a BS. At 704, the UE takes one or more actions to reduce acquisition time when performing the cell acquisition. In some aspects, taking one or more actions may include performing cell acquisition while monitoring for a reduced set of the one or more signals transmitted by the BS. As described in more detail below with reference to FIGS. 8 and 9, in some aspects, taking one or more actions may include coordinating exiting a low power state based on information (e.g., an announcement) regarding the determined opportunities. As described in more detail below with reference to FIG. 10, in some aspects, taking one or more actions may include terminating the cell acquisition based on one or more signal quality measurements and returning to a low power state after terminating the cell acquisition.

According to certain aspects, the BS may assist UEs in performing cell acquisition by boosting (during the determined opportunities) transmission power of one or more signals (e.g., PSS, SSS, PBCH, etc.) used by the UEs when performing cell acquisition.

For example, according to an aspect, the BS may be able to boost transmission power of the one or more signals by allocating all available transmission power to a center bandwidth region of available system bandwidth. In some cases, the center bandwidth region may be 6 resource blocks (RBs) or 1.4 MHz. In some cases, the center bandwidth region may be a center narrowband region (e.g., of 6 RBs, etc.) partitioned out of a wider system bandwidth (e.g., at 1.4/3/5/10/15/20 MHz). In some cases, the BS may boost the transmission power of the one or more signals by allocating all available transmission power to another narrowband region (e.g., as opposed to the center narrowband region) partitioned out the wider system bandwidth.

Alternatively or additionally, according to certain aspects, the BS may reduce a number of physical downlink shared channel (PDSCH) assignments, during the determined opportunities, in order to boost the transmission power of the one or more signals used for cell acquisition. In certain aspects, the BS may determine to transmit zero or a reduced number of PDSCH assignments, during the determined opportunities, in order to boost the transmission power of the one or more signals used for cell acquisition. In some aspects, the BS may still transmit CRS in the whole system bandwidth while boosting the transmission power of the one or more signals (e.g., by allocating all transmission power to a particular narrowband region).

According to certain aspects, the BS may determine opportunities in which to boost transmission power based on knowledge of when one or more UEs are expected to exit a low power state. For example, the BS may have knowledge of the DRX configuration and/or paging cycle of one or more UEs operating in the wireless communication network, and may use the knowledge of the DRX configuration and/or paging cycle to determine the awake cycles of the one or more UEs.

Figure 8:
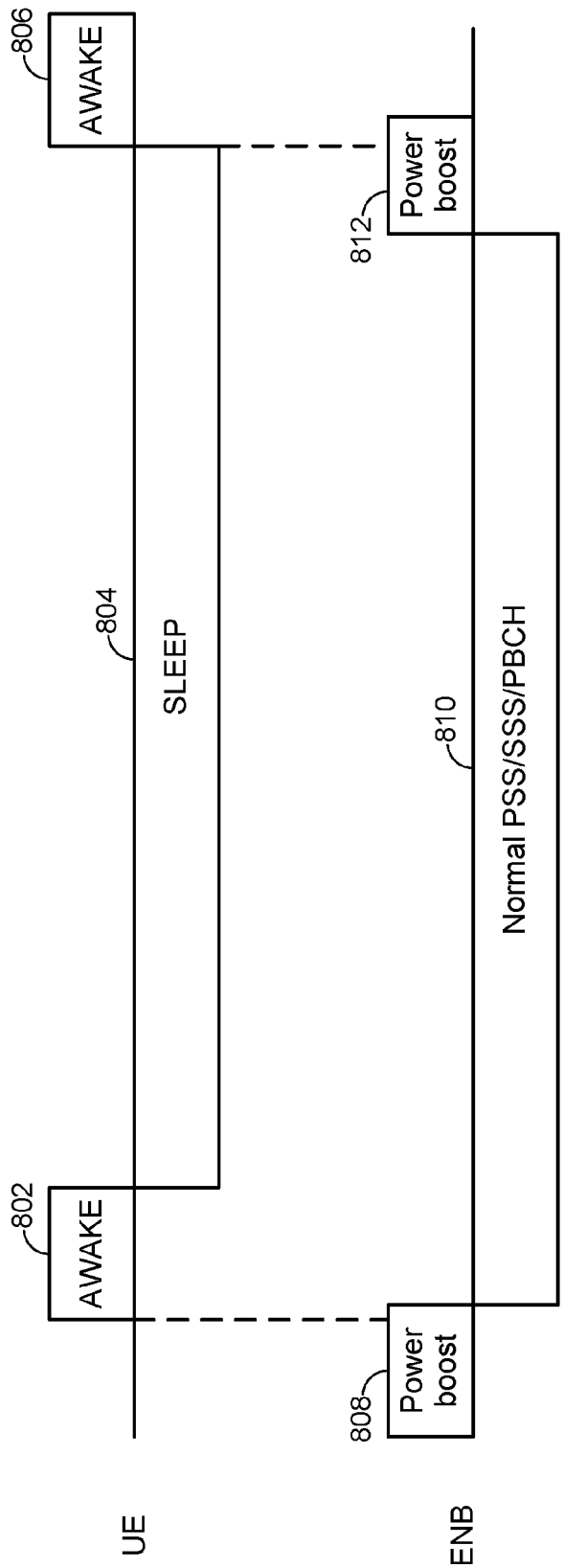
FIG. 8 illustrates an example scenario in which a BS may boost the transmission power of one or more signals used for cell acquisition, in accordance with certain aspects of the present disclosure.

FIG. 8, for example, illustrates an example scenario in which a BS (e.g., BS/eNB 110) may boost the transmission power of one or more signals (e.g., to UE 120) used for cell acquisition during one or more determined opportunities, according to certain aspects of the present disclosure.

As shown in FIG. 8, the BS may determine (e.g., based on a DRX configuration and/or paging cycle of the UE) that the UE 120 is expected to be awake at 802 and 806 (e.g., after exiting a low power state at 804). Based on this knowledge, the BS may determine to boost the transmission power of the one or more signals (e.g., relative to the transmission power of the one or more signals subsequently transmitted at 810) during a time (e.g., boosting opportunities 808 and 812) when the UE is expected to be listening for the one or more signals. According to certain aspects, as shown, the boosting opportunities 808 and 812 may partially overlap the awake cycle of the UE. According to certain aspects, although not shown, the boosting opportunities may completely overlap the awake cycle of the UE. Further, although one UE is shown in FIG. 8, the BS may also have knowledge of the DRX configuration of multiple UEs and may determine the boosting opportunities based on the DRX configuration of multiple UEs.

According to certain aspects, the BS may also be able to configure the DRX configurations of one or more UEs in an effort to align awake cycles of the one or more UEs. For example, in some cases, if there are several UEs with awake cycles that do not overlap, the BS may attempt to align some (or all) of the awake cycles of the UEs in order to reduce the amount of power boosting opportunities.

Additionally or alternatively, according to certain aspects, the BS may announce information regarding the boosting opportunities to the one or more UEs. For example, the BS may periodically or aperiodically boost the transmission power of the one or more signals to the UEs and announce the periodic (or aperiodic) boosting opportunities to the UEs. The UE may then decide whether or not it will awake to receive the one or more signals during the announced boosting opportunities.

Figure 9:
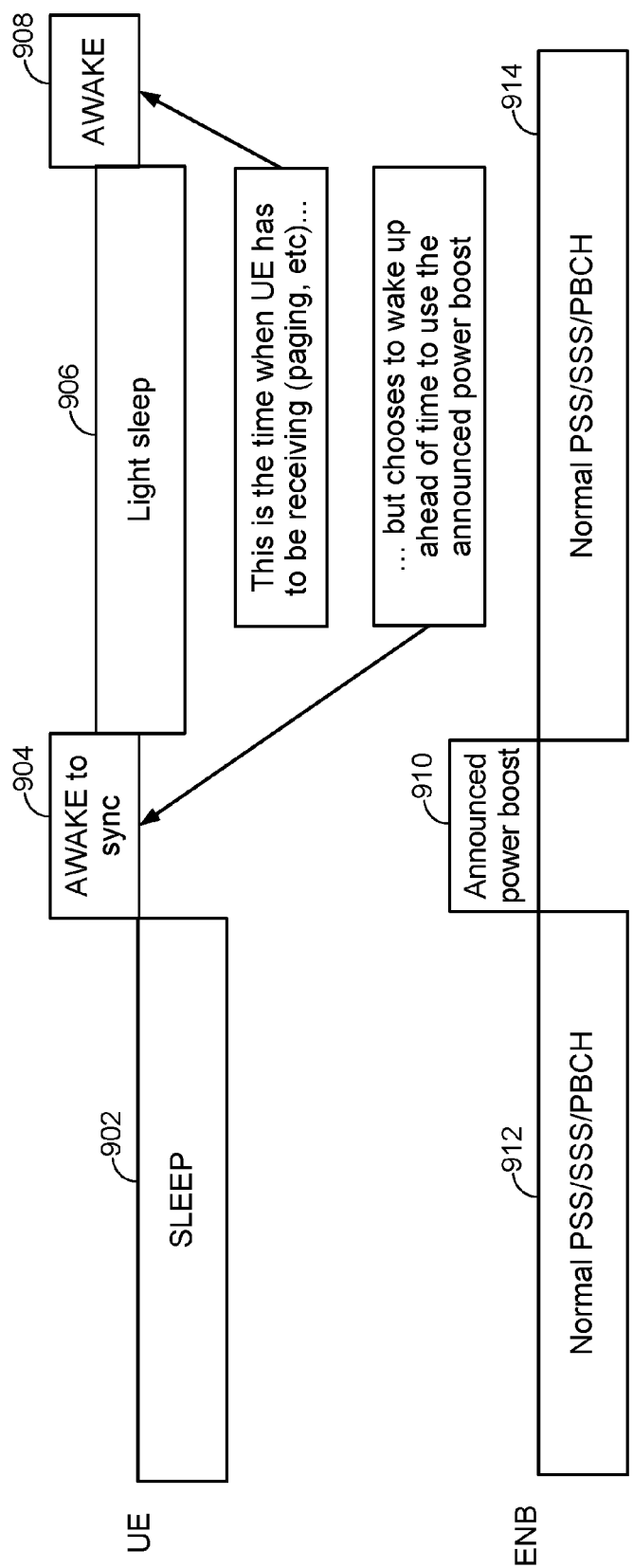
FIG. 9 illustrates an example scenario in which a BS may boost the transmission power of one or more signals used for cell acquisition, in accordance with certain aspects of the present disclosure.

FIG. 9, for example, illustrates an example scenario in which a BS (e.g., BS 110) may boost the transmission power of one or more signals (e.g., to UE 120) used for cell acquisition during an announced boosting opportunity, according to certain aspects of the present disclosure.

According to certain aspects, a UE may receive an announcement from the BS with information regarding opportunities when the one or more signals will be transmitted with boosted transmission power. For example, in some cases, the BS may announce the information regarding the boosting opportunities to the one or more UEs via a broadcast of system information. After receiving the announcement information, the UE may coordinate exiting the first low power state based on the information in the announcement.

According to certain aspects, a UE may initially be in a first low power state 902 (e.g., sleep mode), but may decide to coordinate exiting the first low power state 902 based on the information in the announcement. For example, as shown in FIG. 9, a UE may determine to wake up ahead of time at 904 (e.g. by exiting the first low power state 902) in order to use (e.g., monitoring for the cell acquisition signals during) the announced power boost at 910, based on knowledge of the boosting opportunities. Note the boosted transmission power of the cell acquisition signals (e.g., PSS, SSS, PBCH, etc.) transmitted at 910 is relative to the transmission power of the cell acquisition signals transmitted at 912 and 914.

According to certain aspects, the UE may exit a second lower power state (different from the first low power state) to monitor for one or more signals (e.g., paging messages, etc.), based on the cell acquisition already performed during one of the announced opportunities. For example, after receiving the one or more cell acquisition signals during the boosted opportunity 904, the UE may then decide to enter a second low power state 906 (e.g., light sleep mode) until it is time for the UE to awake at 908 (e.g., based on its original awake cycle). The UE may exit the second low power state 906 to monitor for one or more signals (e.g., paging messages, etc.) not associated with the one or more signals obtained during the announced opportunity. In certain aspects, while in the second low power state 906, the UE may have limited amount of RF monitoring (e.g., to prevent drifting of its local oscillator) while turning off some processing (e.g., turn off its digital signal processor (DSP) receiver) in order to reduce power consumption.

As mentioned above, in some cases, when a UE accesses a cell for the first time, the UE may not know the strongest cell and therefore may perform a cell search and acquisition procedure to acquire the cell. However, as noted above, every time the cell acquisition is performed, the UE may have to detect several amounts of information, such as cell ID (PCI), symbol timing information, frame timing information (e.g., SF0/5), cyclic prefix length (e.g., whether normal or extended cyclic prefix is used), whether TDD/FDD is utilized, etc. Searching for such a large number of hypotheses may increase the amount of time associated with the cell acquisition procedure.

Accordingly, it may be helpful to provide techniques that allow a UE to reduce the time associated with searching for synchronization signals.

According to certain aspects, the techniques presented herein may reduce the time associated with performing cell acquisition by allowing UEs to monitor for a reduced set of synchronization signals when performing cell acquisition. For example, according to certain aspects, the reduced set may be based, at least in part, on a previously determined cell ID, normal/long cyclic prefix, or TDD/FDD information, etc.

For certain devices (e.g., for low cost UEs) exiting a low power state (e.g., the first power state), the low cost UE may be able to determine with high probability that some of the information previously determined from the synchronization signals is the same. For example, for low cost UEs that, in general, have low mobility, the low cost UE may be able to determine that the strongest cell ID is the same as the cell ID of the cell that the low cost UE was synchronized to before entering the low power state. Similarly, the low cost UE may be able to determine that the TDD/FDD information, cyclic prefix length information, etc. are also the same.

Thus, according to certain aspects, upon exiting the first low power state, a UE may be able to reduce the number of possible hypothesis that have to be searched by monitoring only for a timing of a PSS and SSS corresponding to the previously determined cell ID (e.g., as opposed to monitoring for a cell ID, cyclic prefix length, TDD/FDD determination associated with PSS and SSS in addition to the timing of a PSS and SSS).

As also mentioned above, certain devices (e.g., low cost UEs) may operate in poor radio channel conditions, which may increase the time needed for the UEs to successfully perform cell acquisition when waking up (e.g., since the operating channel conditions may be too poor to receive the cell acquisition signals).

Accordingly, it may be helpful to provide techniques that allow the UE temporarily cease the cell acquisition procedure when operating in poor radio channel conditions.

According to certain aspects, the techniques presented herein may allow the UE to terminate cell acquisition based on one or more signal quality measurements and return to the first low power state after terminating the cell acquisition.

Figure 10:
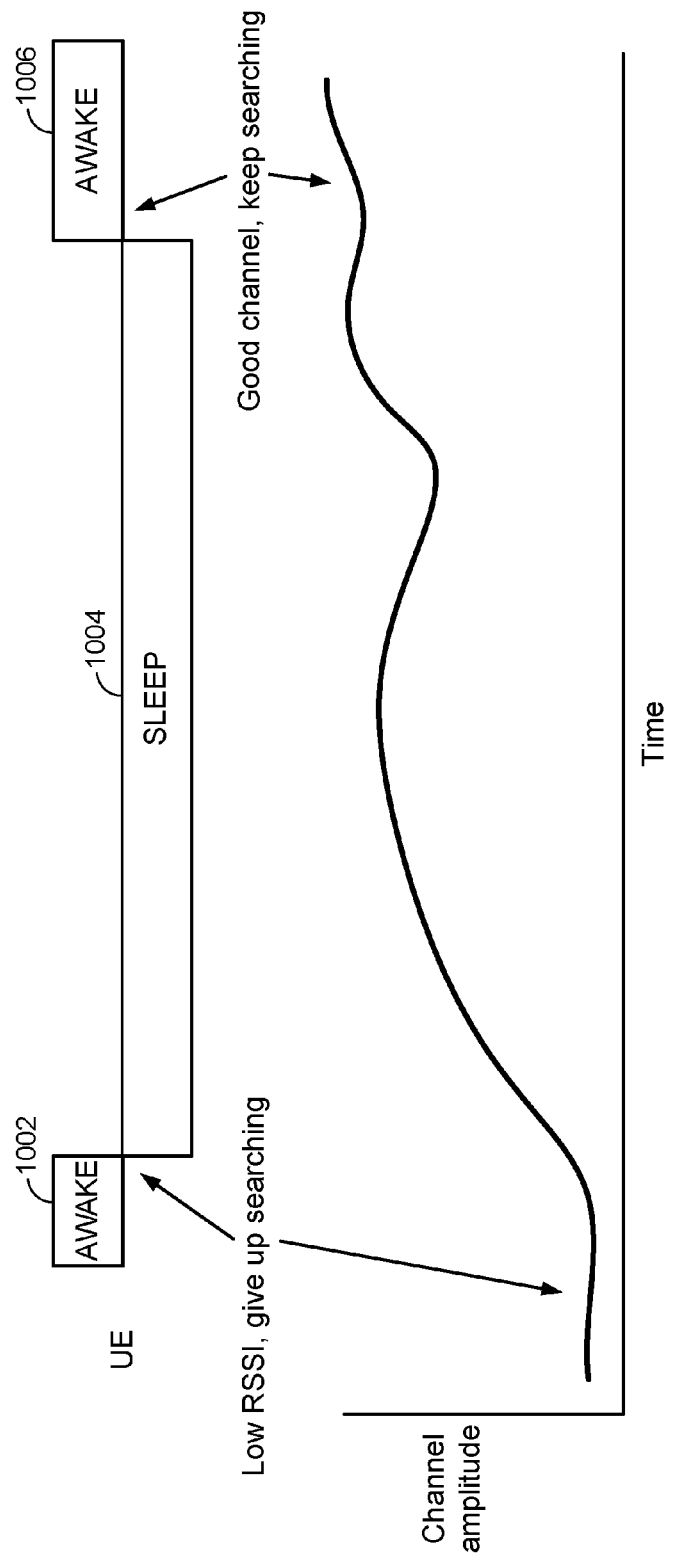
FIG. 10 illustrates an example scenario in which a UE may terminate cell acquisition based on one or more signal quality measurements, in accordance with certain aspects of the present disclosure.

FIG. 10, for example, illustrates an example scenario in which a UE 120 may terminate cell acquisition based on one or more signal quality measurements, according to certain aspects of the present disclosure.

As shown in FIG. 10, if a UE determines, upon exiting the first low power state at 1002 to perform cell acquisition, that radio channel conditions are poor, the UE may decide to stop searching for synchronization signals (e.g., PSS, SSS, PBCH, etc.) and return to the first low power state at 1004 after terminating the cell acquisition. As also shown, upon waking up at 1006 (e.g., during its next awake cycle), the UE may continue the cell acquisition procedure after determining that the radio channel conditions are good.

The one or more signal quality measurements may be a received signal strength indicator (RSSI) measurement, RSRP, pathloss measurement, SNR, or some other metric. In some aspects, this technique may provide time diversity, reduce power consumption, etc.

The various techniques presented herein may improve the time associated with performing cell acquisition and, as a result, improve device performance and/or reduce power consumption.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, deciding, detecting, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output or transmit a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, data, code, or any combination thereof, whether referred to as software, firmware, middleware, code, microcode, hardware description language, machine language, or otherwise. Generally, where there are operations illustrated in Figures, those operations may be performed by any suitable corresponding counterpart means-plus-function components.

For example, means for determining, means for assisting, means for boosting, means for configuring, means for allocating, means for reducing, and/or means for indicating may include one or more processors, such as the transmit processor 220, controller/processor 240, scheduler 246 and/or other processors or modules of the base station 110 illustrated in FIG. 2. Means for announcing, means for boosting, means for transmitting and/or means for receiving may include a transmitter, such as transmit processor 220, TX MIMO processor 230, receive processor 238, MIMO detector 2366, modulator(s)/demodulator(s) 232a-232t, and/or antenna(s) 234a-234t of the base station 110 illustrated in FIG. 2. Means for exiting, means for taking, means for coordinating, means for performing, means for monitoring, means for searching, means for terminating, means for reducing, means for returning, means for determining and/or means for indicating may include one or more processors, such as the receive processor 258, the controller/processor 280 and/or other processors or modules of the user terminal 120 illustrated in FIG. 2. Means for receiving and/or means for transmitting may include receiver processor 258, MIMO detector 256, transmit processor 264, transmit MIMO processor 266, modulator(s)/demodulator(s) 254a-254r, and/or antenna(s) 252a-252r of the user terminal 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    determining one or more opportunities for assisting cell acquisition by one or more user equipments (UEs);
    boosting transmission power for one or more first signals used for cell acquisition during the determined one or more opportunities by reducing a number of physical downlink shared channel (PDSCH) assignments during the determined one or more opportunities and allocating available transmission power to a narrowband region of available system bandwidth that is different from a center bandwidth region of the available system bandwidth, wherein the one or more first signals comprise at least one of a primary synchronization signal (PSS), a secondary synchronization signal (SSS), or a physical broadcast channel (PBCH) signal; and
    transmitting one or more second signals different from the one or more first signals across an entire system bandwidth while boosting the transmission power for the one or more first signals during the determined one or more opportunities.

2. The method of claim 1, wherein the determination is based on knowledge, by the BS, of a discontinuous reception (DRX) configuration of the one or more UEs.

3. The method of claim 2, further comprising:
    configuring DRX configurations of the one or more UEs in an effort to align awake cycles of the one or more UEs.

4. The method of claim 1, further comprising:
    announcing information regarding the determined one or more opportunities to the one or more UEs.

5. The method of claim 4, wherein the information regarding the determined one or more opportunities is announced via a broadcast of system information.

6. An apparatus for wireless communications, comprising:
    means for determining one or more opportunities for assisting cell acquisition by one or more user equipments (UEs);
    means for boosting transmission power for one or more first signals used for cell acquisition during the determined one or more opportunities by reducing a number of physical downlink shared channel (PDSCH) assignments during the determined one or more opportunities and allocating available transmission power to a narrowband region of available system bandwidth that is different from a center bandwidth region of the available system bandwidth, wherein the one or more first signals comprise at least one of a primary synchronization signal (PSS), a secondary synchronization signal (SSS), or a physical broadcast channel (PBCH) signal; and
    means for transmitting one or more second signals different from the one or more first signals across an entire system bandwidth while boosting the transmission power for the one or more first signals during the determined one or more opportunities.

7. The apparatus of claim 6, wherein the means for determining determines the one or more opportunities based on knowledge, by the apparatus, of a discontinuous reception (DRX) configuration of the one or more UEs.

8. The apparatus of claim 7, further comprising:
    means for configuring DRX configurations of the one or more UEs in an effort to align awake cycles of the one or more UEs.

9. The apparatus of claim 6, further comprising:
    means for announcing information regarding the determined one or more opportunities to the one or more UEs.

10. The apparatus of claim 9, wherein the information regarding the determined one or more opportunities is announced via a broadcast of system information.

11. An apparatus for wireless communications, comprising:
 at least one processor configured to:
  determine one or more opportunities for assisting cell acquisition by one or more user equipments (UEs); and
  boost transmission power for one or more first signals used for cell acquisition during the determined one or more opportunities by reducing a number of physical downlink shared channel (PDSCH) assignments during the determined one or more opportunities and allocating available transmission power to a narrowband region of available system bandwidth that is different from a center bandwidth region of the available system bandwidth, wherein the one or more first signals comprise at least one of a primary synchronization signal (PSS), a secondary synchronization signal (SSS), or a physical broadcast channel (PBCH) signal;
 a transmitter configured to transmit one or more second signals different from the one or more first signals across an entire system bandwidth while the transmission power for the one or more first signals is boosted during the determined one or more opportunities; and
 a memory coupled to the at least one processor.

12. The apparatus of claim 11, wherein the determination is based on knowledge, by the apparatus, of a discontinuous reception (DRX) configuration of the one or more UEs.

13. The apparatus of claim 11, wherein the at least one processor is further configured to configure DRX configurations of the one or more UEs in an effort to align awake cycles of the one or more UEs.

14. The apparatus of claim 11, wherein the transmitter is further configured to transmit information regarding the determined one or more opportunities to the one or more UEs.

15. The apparatus of claim 14, wherein the information regarding the determined one or more opportunities is transmitted via a broadcast of system information.

16. A non-transitory computer-readable medium having computer executable code stored thereon for wireless communications by an apparatus, the computer executable code comprising:
 code for determining one or more opportunities for assisting cell acquisition by one or more user equipments (UEs);
 code for boosting transmission power for one or more first signals used for cell acquisition during the determined one or more opportunities by reducing a number of physical downlink shared channel (PDSCH) assignments during the determined one or more opportunities and allocating available transmission power to a narrowband region of available system bandwidth that is different from a center bandwidth region of the available system bandwidth, wherein the one or more first signals comprise at least one of a primary synchronization signal (PSS), a secondary synchronization signal (SSS), or a physical broadcast channel (PBCH) signal; and
 code for transmitting one or more second signals different from the one or more first signals across an entire system bandwidth while boosting the transmission power for the one or more first signals during the determined one or more opportunities.

17. The non-transitory computer-readable medium of claim 16, wherein the code for determining determines the one or more opportunities based on knowledge, by the apparatus, of a discontinuous reception (DRX) configuration of the one or more UEs.

18. The non-transitory computer-readable medium of claim 17, further comprising computer executable code for configuring DRX configurations of the one or more UEs in an effort to align awake cycles of the one or more UEs.

19. The non-transitory computer-readable medium of claim 16, further comprising computer executable code for announcing information regarding the determined one or more opportunities to the one or more UEs.

20. The non-transitory computer-readable medium of claim 19, wherein the information regarding the determined one or more opportunities is announced via a broadcast of system information.

* * * * *